United States Patent
Schluetter et al.

(10) Patent No.: US 7,653,589 B1
(45) Date of Patent: Jan. 26, 2010

(54) SYSTEM AND METHOD FOR RANDOMIZING ORDERS IN AN ELECTRONIC TRADING ENVIRONMENT

(75) Inventors: Jens-Uwe Schluetter, Evanston, IL (US); Harris C. Brumfield, Chicago, IL (US); Robert A. West, Chicago, IL (US); Sagy Pundak Mintz, Lincolnshire, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

(21) Appl. No.: 11/415,439

(22) Filed: May 1, 2006

Related U.S. Application Data

(63) Continuation of application No. 10/304,275, filed on Nov. 26, 2002.

(51) Int. Cl.
*G06Q 40/00* (2006.01)
(52) U.S. Cl. .................................................. 705/37
(58) Field of Classification Search ................ 705/37
See application file for complete search history.

(56) References Cited

U.S. PATENT DOCUMENTS

| | | | |
|---|---|---|---|
| 6,615,188 B1 | 9/2003 | Breen et al. | |
| 6,912,511 B1 * | 6/2005 | Eliezer et al. | 705/37 |
| 2001/0032163 A1 * | 10/2001 | Fertik et al. | 705/37 |
| 2001/0044752 A1 | 11/2001 | Hirakawa | |
| 2001/0044767 A1 * | 11/2001 | Madoff et al. | 705/37 |
| 2002/0046146 A1 | 4/2002 | Otero | |
| 2002/0046149 A1 | 4/2002 | Otero | |
| 2002/0046151 A1 | 4/2002 | Otero | |
| 2002/0046156 A1 | 4/2002 | Horn | |
| 2002/0049661 A1 * | 4/2002 | Otero et al. | 705/37 |
| 2002/0052816 A1 * | 5/2002 | Clenaghan et al. | 705/36 |
| 2002/0052827 A1 | 5/2002 | Waelbroeck et al. | |
| 2002/0073016 A1 * | 6/2002 | Furbush et al. | 705/37 |
| 2002/0133454 A1 | 9/2002 | Malitzis et al. | |
| 2002/0147675 A1 * | 10/2002 | Das et al. | 705/37 |
| 2002/0178104 A1 * | 11/2002 | Hausman | 705/37 |
| 2003/0033235 A1 * | 2/2003 | Hummelgren | 705/37 |

(Continued)

FOREIGN PATENT DOCUMENTS

EP 1104904 A1 6/2001

(Continued)

OTHER PUBLICATIONS

Foley, Kevin, "Electronic Trading Networks, Stock Exchange Competition", Oct. 17, 2002, FDCH Congresional Testimony.*

(Continued)

*Primary Examiner*—Hani Kazimi
*Assistant Examiner*—John D Scarito
(74) *Attorney, Agent, or Firm*—McDonnell Boehnen Hulbert & Berghoff LLP

(57) ABSTRACT

When a trading application on a client terminal receives a trade order, a randomizer application may automatically randomize one or more order parameters to generate a randomized order. For example, an order quantity, a price level, and/or a time period between sending any two consecutive orders may be randomized. In another example, in a thin market randomized order quantities may be decreased and in a heavy market randomized order quantities may be increased. The randomized order is then automatically placed on the market.

15 Claims, 4 Drawing Sheets

U.S. PATENT DOCUMENTS

| | | |
|---|---|---|
| 2003/0093359 A1 | 5/2003 | Martyn et al. |
| 2003/0126065 A1* | 7/2003 | Eng et al. .................... 705/37 |
| 2003/0236737 A1* | 12/2003 | Kemp et al. ................... 705/37 |
| 2004/0059666 A1* | 3/2004 | Waelbroeck et al. .......... 705/37 |
| 2004/0143539 A1 | 7/2004 | Penney et al. |

FOREIGN PATENT DOCUMENTS

| | | |
|---|---|---|
| WO | WO00/51043 A1 | 8/2000 |
| WO | WO00/65510 A1 | 11/2000 |
| WO | WO01/22266 A2 | 3/2001 |
| WO | WO02/33621 A1 | 4/2002 |
| WO | WO02/33623 A1 | 4/2002 |
| WO | WO02/33635 A1 | 4/2002 |
| WO | WO02/33636 A1 | 4/2002 |
| WO | WO02/33637 A1 | 4/2002 |
| WO | WO02/086657 A2 | 10/2002 |
| WO | WO02/093325 A2 | 11/2002 |

OTHER PUBLICATIONS

Schnitzlein, Charles, "Call and Continuous Trading Mechanisms Under Asymmetric Information: An Experimental Investigation", Journal of Finance, vol. L1, No. 2, Jun. 1996.*

* cited by examiner

SYSTEM AND METHOD FOR RANDOMIZING ORDERS IN AN ELECTRONIC TRADING ENVIRONMENT

CROSS REFERENCE TO RELATED APPLICATION

This application is a continuation of U.S. patent application Ser. No. 10/304,275 filed Nov. 26, 2002, entitled "System and Method for Randomizing Orders in an Electronic Trading Environment" the contents of which are fully incorporated herein by reference.

FIELD OF INVENTION

The present invention is directed towards electronic trading. More specifically, the present invention is directed towards providing means for randomizing parameters associated with an order, and automatically submitting orders including such randomized parameters.

BACKGROUND

Over the years, institutions have existed that allowed people to buy and sell tradable objects from one another. Since the advent of traditional trading methods, the basic manner in which such trading has been conducted has remained essentially the same. However, recent technological advances have provided for the evolution of trading methods from a manually intensive process to technologically enabled electronic platforms. The rapid increase in the number of people performing trades electronically has continued to account for more and more of the total percentage of transactions in the market. In fact, what was previously seen as a supplement to the traditional pit trading, now, electronic trading is expected to continue to transform the trading process as modern technology advances.

Many exchanges throughout the world now support electronic trading. Electronic trading has made it possible for an increasing number of people to actively participate in a market at any given time. The increase in the number of potential market participants has advantageously led, among other things, to a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used as an electronic trading environment. For example, some market participants may link to the host through a direct connection such as a T1 or ISDN. Alternatively, some participants may link to the exchange through direct connections and through other common network components such as high-speed servers, routers, gateways, and so on.

Regardless of the way in which a connection is established, software running on the clients allows people to log onto one or more exchanges and participate in one or more markets. Some clients run software that creates specialized interactive trading screens. In general, the trading screens enable people to enter orders into the market, obtain market quotes, and monitor positions. The range and quality of features available on such screens vary according to the specific software application being run.

Electronic markets are anonymous and, therefore, trading opportunities should be equal between all traders since traders do not have the ability to give or receive any preferential treatment to or from any other traders, or have knowledge related to what other traders are doing in terms of which order is associated with which trader, for instance. Although electronic markets are anonymous, some traders can deduce identities of other traders by detecting patterns in orders being placed in an electronic market, such as by detecting repeating order quantities or other parameters associated with the orders. Additionally, traders can use automated tools that can assist them in detecting those patterns in a faster and more accurate manner. Thus, using such detected patterns, traders could abuse their knowledge by mimicking orders that were placed by other traders or by reacting to other traders' trading behaviors and strategies.

Thus, it is still desirable for electronic trading applications to offer tools that can assist a trader in trading in an electronic trading environment, help the trader make trades at the most favorable prices in a speedy and accurate manner, while allowing the trader to conveniently keep his trading activities as anonymous as possible.

BRIEF DESCRIPTION OF THE DRAWINGS

Embodiments of the present invention are described herein with reference to the following drawings, in which.

DETAILED DESCRIPTION OF THE PREFERRED EMBODIMENT(S)

It is beneficial to prevent deduction of order patterns in an electronic trading environment. According to embodiments described hereinafter, one or more order parameters are randomized before the order is placed in the market. More specifically, in one embodiment, if execution of an order requires placement of a plurality of orders over a predetermined period of time, one or more parameters associated with each or a few of the plurality of orders, such as order quantities or time periods between submitting two consecutive orders, may be randomized before the orders are submitted in the market, so that order patterns are much more difficult to detect or impossible to detect altogether.

While the present invention is described hereinafter with reference to illustrative embodiments for particular applications, it should be understood that the present invention is not limited thereto. Those having ordinary skill of art will recognize that many additional modifications and embodiments are possible as well.

Figure 1:
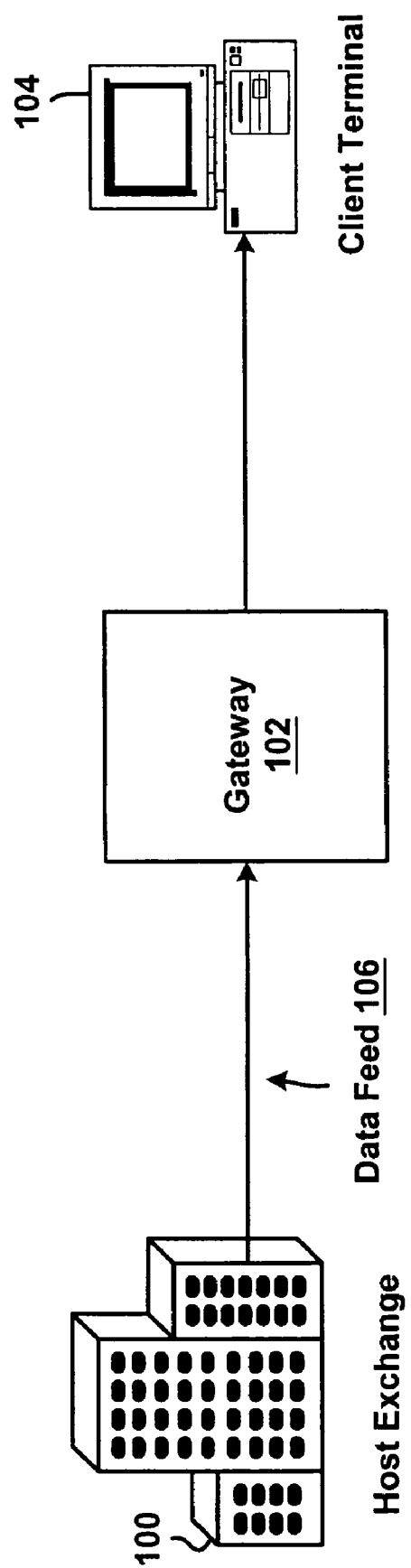
FIG. 1 is an example of a network configuration for a communication system utilized to access one or more exchanges.

FIG. 1 shows an example system that may be used to implement network connection between an exchange and client terminals. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, a processor executing a set of machine language instructions stored in memory may execute various functions. Provided with the present disclosure, those skilled in the art can readily prepare appropriate computer instructions to perform such functions.

Referring back to FIG. 1, the illustrated system includes a host exchange 100, a gateway 102, and a client terminal 104. It should be understood that even though the system illustrates only one client terminal 102 communicating with a single host exchange 100, the client terminal 102 could also communicate with more than one host exchange via the gateway 102 or other gateways corresponding to each host exchange. Further, it should be understood that the example system is not limited to a single client terminal. In an alternative embodiment, a trading house including a plurality of client terminals may connect to the host exchange 100 via the gateway 102.

The host exchange 100 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). However, it should be understood that the exchanges could also include any other existing or later developed exchanges. Further, it should be understood that the preferred embodiments are not limited to any particular network architecture or trading application, but rather may be applied with utility on any client device in any network that can be used for electronic trading. Furthermore, the invention is not limited to a completely electronic trading environment where orders are sent to an electronic matching engine. For example, the invention could be utilized with an electronic trading application, which sends orders electronically to a terminal where a person (e.g., a floor broker) executes those orders in a traditional open outcry trading floor.

The host exchange 100 connects to the client terminal 104 via the gateway 102. The gateway 102, as is known in the art, may include one or more computers, or software programs, and receives information from the host exchange 100 and sends the information down to the client terminal 104. Preferably, the gateway 102 receives data from the host exchange 100 and converts the received data to a format compatible with the protocols used on the client terminal 104. Alternatively, the conversion could be performed at the client terminal 104.

The host exchange 100 provides market information to the client terminal 102, and may relay this information, or a portion thereof, collectively called a data feed 106, over a network to market participants at the client terminal 104. A data feed from one exchange may contain different information representing different tradable objects than another data feed from a second exchange. In one embodiment, a data feed may include market information related to all tradable objects being traded at the host exchange 100. In such an embodiment, when the client terminal 104 receives such a data feed, a trading application on the client terminal 104 may extract from the received data feed information related to one or more tradable object selected by a user at the client terminal 104. Alternatively, the gateway 102 could be configured to extract the information related to tradable objects selected by a particular user at the client terminal 104, and could send only the relevant information to the client terminal 102. Further, alternatively, the host exchange 100 may have knowledge of tradable object(s) that were selected by a user at the client terminal 104, and may provide to the client terminal 104 only market data related to the selected tradable objects.

As used herein, the term "tradable object" refers simply to anything that can be traded with a quantity and/or price. It includes, but is not limited to, all types of tradable objects such as financial products, which can include, for example, stock options, bonds, futures, currency, and warrants, as well as funds, derivatives, and collections of the foregoing, and all types of commodities, such as grains, energy, and metals. The tradable object may be "real," such as products that are listed by an exchange for trading, or "synthetic," such as a combination of real products that is created by a user. Also, a tradable object could actually be a combination of other tradable objects, such as a class of tradable objects.

The data feed 106 may include information relating to prices and quantities of one or more tradable objects. For example, the data feed 106 could provide data corresponding to quantities at inside market prices and/or data corresponding to quantity at different prices. The inside market is the highest bid price ("HBP") and the lowest ask price ("LAP") for a tradable object. Data feeds from some exchanges may also provide data related to the market depth. The market depth of a tradable object is each available pending bid and ask quantity (or any aggregation or combination thereof), entered at a particular price. The extent of the market depth available to a trader depends on the host exchange, and some exchanges provide an infinite market depth, while others provide only quantities associated with the inside market and some may provide no market depth.

The client terminal 104 may include any computing terminal, such as a personal computer, a handheld device, or any other currently existing or later developed computing terminals. Further, it should be understood that the client terminal 104 may connect to the gateway 102 via wireless communication links, wireline communication links, or a combination thereof. In general, according to the embodiments described herein, the client terminal 104 is a computer that allows a trader to participate in the market hosted at the exchange 100, and uses software that creates specialized trading screens on the client terminal. The range and quality of features available to the trader on his or her client terminal's screen may vary according to the specific software application being run on the client terminal 106. Among other functional features, a trading screen being run on the client terminal 106 may enable traders to enter and execute orders, obtain market quotes, and monitor positions. However, it should be understood that, in addition to interactive trading screens, the client terminal 104 may also run automated non-interactive types of trading applications.

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display of Market Depth and Price Consolidation," filed on Oct. 5, 2001, the contents of both are incorporated herein by reference. Moreover, the trading application may implement tools for trading tradable objects that are described in U.S. patent application Ser. No. 10/125,894, filed on Apr. 19, 2002, entitled "Trading Tools for Electronic Trading," the contents of which are incorporated herein by reference.

Randomized Quoting

As was described in reference to the preceding figure, a client terminal consists of one or more computers (or software applications) that allow a trader to participate in the market hosted at the exchange. More specifically, the client terminal uses one or more trading applications that create specialized trading interfaces. Additionally, as will be described in reference to the subsequent figures, the trading application may communicate with a randomizer application that allows one or more parameters specified in the initial order to be automatically randomized so that detection of trading patterns and strategies associated with orders is more difficult or impossible altogether.

Figure 2:
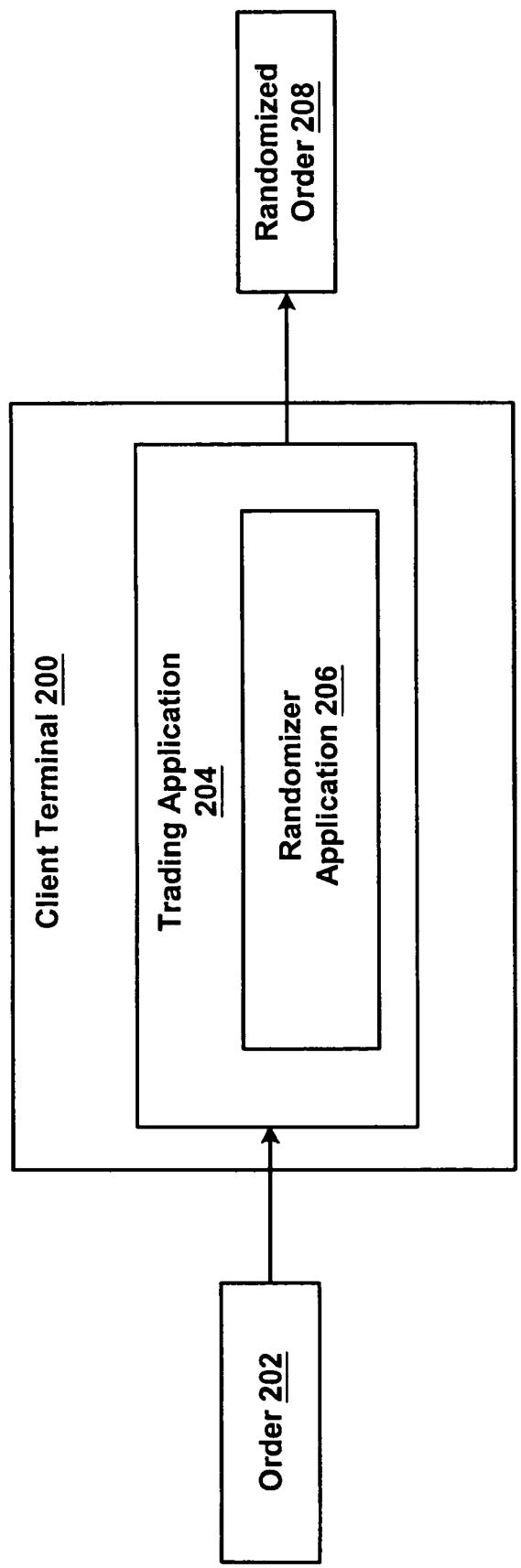
FIG. 2 is a simplified block diagram of a client terminal and a corresponding data flow illustrating a relationship between an incoming order and a randomized order.

FIG. 2 is a simplified block diagram of a client terminal 200 and a corresponding data flow illustrating a relationship between an incoming order 202 and a randomized order 208. The client terminal 200 includes a trading application 204 and a randomizer application 206. As mentioned in reference to the preceding paragraphs, it should be understood that the use of the trading application 204 allows a trader to view market data, enter and cancel trade orders, as well as view the outstanding orders. The randomizer application 206 allows modifying or randomizing one or more parameters associated with an incoming order, such as an order 202, to generate a modified order, or a randomized order 208 including one or more randomized parameters of the original order 202. It should be understood that the randomizer application 206 may include one or more algorithms for randomizing incoming orders, and a few embodiments thereof will be described in greater detail below. Additionally, it should be understood that the randomizer application 206 may receive a number of user configurable parameters to be applied in randomizing of incoming orders.

In the embodiment illustrated in FIG. 2, the randomizer application 206 and the trading application 204 may share commonly used information. In an alternative embodiment, the randomizer application 206 may be a separate and independent application from the trading application 204. Further, it should be understood that even though FIG. 2 illustrates the randomizer application 206 installed on the client terminal 200, in an alternative embodiment, the randomizer application 206 could be installed at a server and/or a gateway. In such an embodiment, for example, when a user of the client terminal 200 subscribes to randomizer services provided at the randomizer application 206, a server or a gateway may dynamically activate a randomization process for all or some trade orders that are initiated at the client terminal. It should be understood that, in such an embodiment, when a user inputs randomization control parameters to be applied during the process of randomizing orders, the client terminal may communicate those parameters to a server or a gateway hosting the randomizer application 206.

Further, it should be understood that, in an alternative embodiment, the randomizer application 206 could be partially installed on the server and/or gateway, and some portions may be installed at the client terminal. Such an embodiment may turn out especially beneficial when a client terminal has little processing power or not enough storage space to store algorithms or applications to be used for randomizing orders. Those skilled in the art will understand that there are many other alternative embodiments. Additionally, it should be understood that the trading application 204 and the randomizer application 206 can be stored in a random access memory, a read only memory, a combination thereof, or another storage medium available at the client terminal 200 or another network entity.

Figure 3A:
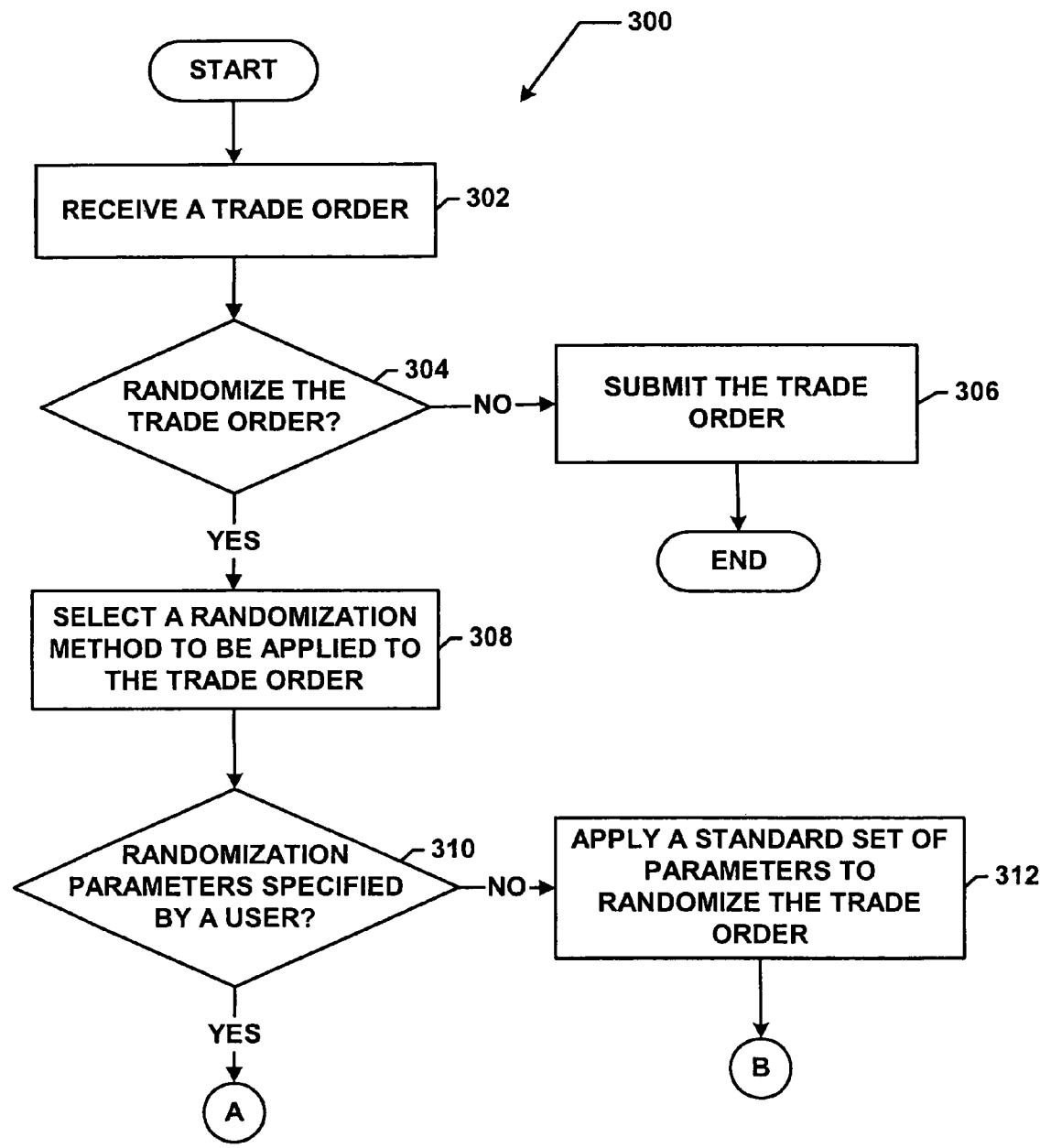
FIG. 3 is a flow chart illustrating a method for randomizing orders according to one embodiment.
Figure 3B:
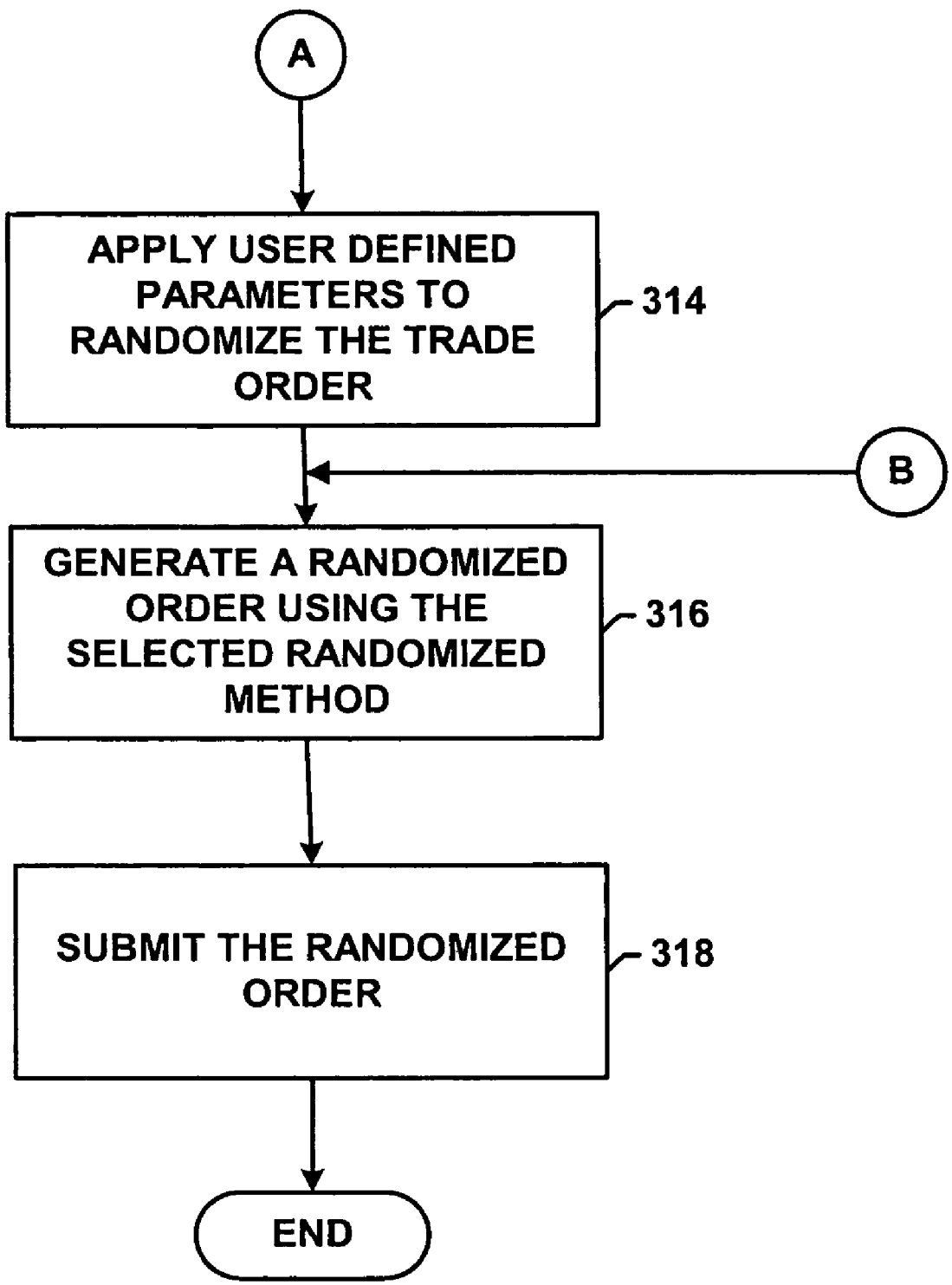

FIGS. 3A and 3B illustrate an example method 300 for generating randomized orders according to one embodiment. It should be understood that the flow chart provides only a general description of generating randomized orders, and more or fewer steps could be included in the flow chart, and the steps may occur in one or more orders which are different from the order of steps illustrated in FIGS. 3A and 3B. FIGS. 3A and 3B will be described in relation to the client terminal illustrated in FIG. 2. However, it should be understood that different embodiments are possible as well, and the steps described in reference to the method 300 may be performed at one or more network entities such as gateways or network servers, for instance.

Referring to FIG. 3A, at step 302, the trading application 204 at the client terminal 200 detects an incoming request to place a trade order on the market. According to one embodiment, the request may be received via a trading interface such as the MD Trader™-style interface, for instance. When the trading application 204 detects that the trade order has been received, at step 304, the trading application 204 determines whether or not the order should be randomized. According to one embodiment, the determination may be made based on an order type or user configuration. For instance, a user may enable a randomization method to be applied to any type of order that is placed by the user. Alternatively, only specific types of orders, configurable by a user, could be randomized. If the trading application 204 determines that the randomization is not enabled for the order, at step 306, the trade order is submitted in its original format. However, if the determination is made to randomize the trade order, then, at step 308, the randomizer application 206 selects a randomization method to be applied to the trade order. It should be understood that the trading application 204 may dynamically apply the same randomization method to any order type. Alternatively, a user may control which of the available randomization methods is applied by the randomizer application 206 to randomize a trading order based on an order type, time of day, or any other factor.

Additionally, a user may specify randomization parameters, or values, to be used in the predetermined randomization methods. Thus, at step 310, the randomizer application 206 determines if such user-configured parameters have been specified for the randomization method selected at step 308. If the user has not specified any predetermined parameters, at step 312, the randomizer application 206 may apply a standard set of parameters to randomize the trade order. Referring to FIG. 3B, if the user-defined parameters are available, at step 314, the randomizer application 206 applies the user-defined parameters to randomize the trade order. At step 316, the randomizer application 206 generates a randomized order using the selected randomization method and parameters, and, at step 318, the trading application 204 submits the randomized order.

It should be understood that according to one embodiment, randomization methods may be applied to single orders being placed by a trader, or orders that are executed by placing a plurality of consecutive orders, such as an Iceberg order type, for instance. A typical Iceberg order type may be defined with a total desired position and a constant quantity to order. As each constant quantity gets filled, an automated trading tool, such as the trading application 204, places an additional order of the same constant quantity until the total desired position is reached, where the last order placed by the trading application 204 amounts to the remaining quantity of the total position. For example, if the total desired position is 100, and the constant quantity value is 8, the trading application may place 12 orders of constant quantity 8, and the $13^{th}$ order may be of quantity 4 to reach the total desired position of 100.

It should be understood that the randomizer application 206 may use a plurality of randomization methods that may be applied to trade orders. A few embodiments will be described hereinafter. However, it should be understood that more, fewer, different or a combination of many randomization methods randomizing more than one order parameter at the same time could also be used, and the present invention is not limited to any particular randomization method.

(i) Single-Order Randomization Methods

According to one embodiment, single-order randomization methods may involve randomizing order quantities. In one embodiment, a percentage value may be applied to an order quantity to determine a randomized order quantity. In such an embodiment, the randomizer application 206 may select a random percentage from a range of percentages, apply the selected random percentage to the order quantity, add or subtract the calculated value to/from the original order quantity, and, thus, determine a randomized order quantity. It should be understood that the range of percentages could be user configurable. Alternatively, if no user input is received defining one or more percentage value or a percentage range, the randomizer application 206 may dynamically select a percentage range from one or more static percentage ranges that could be pre-configured on the randomizer application 206. For instance, a user may configure the upper and lower percentage levels to be 4% and 13%, respectively, and then may designate the order quantity of 100. In such an embodiment, the randomizer application 206 may first apply the upper and then lower percentage level to the order quantity to determine a range of randomized order quantities of 87-104. Subsequently, the randomizer application 206 may select a random order quantity from the range of 87-104.

It should be understood that the trading application 204 may use any selection mechanism, an algorithm or a user configurable method, to select a random order quantity from the determined range. Further, it should be understood that the upper and lower percentage levels may be symmetric or asymmetric, i.e., the same percentage values or different percentage values could be used. Additionally, it should be understood that only one percentage value could be used instead. Referring back to the above example, if 13% is a specified percentage value, a range of randomized order quantities could be determined to be 87-100, 100-113 or 87-113 depending on the user configuration. Further, instead of determining a range of random quantities and then selecting a randomized quantity from the range, a percentage value could be applied to an order quantity, and then a result could be simply added or subtracted to/from the specified order quantity. For instance, using 13% for an order quantity of 100, the randomized quantity could be 87 or 113.

Alternatively, one or more constant values may be applied to a user-specified order quantity to determine a randomized range of quantities. For instance, a user may configure one or more values to be applied to the order quantity that may be used at the randomizer application 206 to determine a range of randomized order quantities. In such an embodiment, a user may specify an upper range value and a lower range value, such as, for example, 5 and 3, respectively. Then, if the user enters the order quantity, such as 25, for example, the randomizer application 206 may first use the upper and lower range values to determine a range of randomized order quantities to be 22-30, and then may randomly select an order quantity from that range. It should be understood that, similarly to the percentage values, the constant values could also be symmetric or asymmetric.

Further, alternatively, the order quantity may be randomized using a predetermined algorithm that takes into consideration trading activities in the market. One such algorithm may apply a standard deviation to the depth at the specified price level associated with the order quantity. The randomizer application 206 may randomize the order quantity based on the standard deviation of the depth at the specified price level. In such an embodiment, the standard deviation may be calculated over a specific period of time that may be user configurable or may be randomly selected at the randomizer application 206. For example, assuming that the standard deviation is applied to quantities at four time intervals (t=0, t-1, t-2, and t-3), and ..........................the respective quantities are 5, 8, 3, and 4 at the price level associated with the order quantity specified by the user, the standard deviation may be calculated using the following equation:

$$\text{Standard Deviation} = \sqrt{\frac{\sum (x-m)^2}{n-1}} \qquad \text{Eq. 1}$$

In Eq. 1, "x" is the quantity at each time interval, "m" is the mean quantity, and "n" is the number of time intervals or a number of considered quantities. Thus, using the above Eq. 1, in the given example, where x=5, 8, 3, and 4, m=5, and n=4, the standard deviation is 2.16. The randomizer application 206 may then apply the standard deviation value of 2.16 to the order quantity specified by a user and may determine a range of randomized order quantities. For example, if the order quantity is 100, then the range of randomized quantities is 97.84-102.16. The randomizer application 206 may then randomly select the randomized order quantity from the range of 97.84-102.16, such as 98, for instance. It should be understood that the present invention is not limited to using the standard deviation function described above, and different standard deviation functions, or other functions, algorithms or user defined formulas, could also be used.

In one embodiment, a user may define randomized orders as market orders. In such an embodiment, for example, a randomized quantity order may be placed at the current market price. Alternatively, however, a randomized order may be a limit order, or any other type of order that is not placed at the current market price. A limit order, as known in the art, is an order to sell or buy at a specific price, and may be executed either at the defined price or a better price.

Further, in an alternative embodiment, a price level associated with an order quantity could be randomized as well. It should be understood that the present invention is not limited to randomizing order quantities. For instance, to randomize a certain user-defined price level, a certain percentage level or a constant may be applied to the predefined price to determine a randomized price or a range of randomized prices. The randomizer application 206 may then randomly select one of the prices from the range and place the order at the selected randomized price. Alternatively, the randomized application 206 could select a random price level within a specified number of ticks away from the price level specified by a user. It should be understood that the number of ticks may be user configurable, and the user may specify whether the number of ticks should be added or subtracted from the specified price level. Further, it should be understood that the randomization method may be applied to each order placed by the user, or it could be applied randomly so that, for instance, every other order submitted to an exchange is randomized, for instance. It should be understood that a user may configure which orders should be randomized.

(ii) Multiple-Order Randomization Methods

As mentioned earlier, the randomization methods may be applied to an order that is executed by placing a number of smaller orders until a desired position is reached, i.e., an Iceberg order type, for instance.

As is known in the art, when a user places an Iceberg order, the user specifies a total desired position and a constant order quantity for a plurality of orders that are to be submitted in the market until the total desired position is reached. According to one embodiment, in addition to the two user-defined order parameters of the Iceberg order, i.e., a total desired position and an order quantity, a user may also define one or more randomization factors to be applied to the specified order quantity. As described in reference to the preceding section, the randomization factor may consist of one or more percentage values or constant values that are then applied to determine a range of randomized order quantities. For example, if the user-defined total desired position is 100, the user-defined order quantity is 20, and the user-defined percentage is 15%, the randomizer application 206 may apply the defined percentage to the order quantity to determine a range of randomized quantities of 17-23. Next, the randomizer application 206 may select an order quantity from the range, and the order of the randomized quantity may be submitted. Once the first order is filled, a second order quantity (different or the same as the first randomized order quantity) is randomly selected from the calculated range, and the second order is submitted at the selected order quantity. A number of consecutive orders may be then submitted until the desired total position is reached. It should be understood that the last order quantity may fall outside of the range of randomized quantities so that the last order quantity is the remaining quantity of the total desired position. In one embodiment, as described in earlier paragraphs, each order associated with the Iceberg order may be a market order or an order at a specific price defined by a user.

Alternatively, according to another embodiment, instead of defining an order quantity, a user may specify a number of orders to reach a desired position. Such an embodiment may prove especially beneficial if a user is charged based on the number of submitted orders, for instance. Thus, in such an embodiment, a user may specify a total desired position, a number of orders to reach the total desired position, and a randomization factor, such as one or more percentage values or constants. For example, if a total desired position is 20, a number of orders is 4, and a range parameter is set to +/−3, then the randomizer application 206 may determine an order quantity of 5 (i.e., by dividing the total desired position (20) by the number of orders to reach the desired position (4)). The randomizer application 206 may then use the randomization factor (+/−3) to determine a range of randomized order quantities of 2-8. Next, the trading application 206 may select three random quantities from the randomized range, and place the last order corresponding to the remaining quantity left so that the total desired position is reached. For example, the first three order quantities could be 2, 4, and 4, and the last order quantity could be 10, so that the total desired quantity of 20 is reached by placing four orders.

According to the embodiment described in the preceding paragraphs, the orders may be submitted at the inside market price or any price defined by a user. Alternatively, the orders might be submitted at some offset, configurable by a user, from the inside market price, or the user may place a limit order or any variation thereof. For instance, a sell order may be placed at plus and/or minus the best bid price, and a buy order may be placed at plus and/or minus the best ask price. However, in such an embodiment, the market might move away from the price at which an order has been placed, and the working quantities associated with the order might be so off the market that it might never get filled. To solve such a problem, the working quantity associated with an order that did not get filled may be added to the quantity of the next order. In such an embodiment, when the time comes to submit the next order, the working quantity associated with the previous order may be cancelled, e.g., an order may be deleted, and then that remaining quantity may be added to the new order that is submitted at the inside market price or at some offset away from the inside market price, thus, increasing the probability of the quantity getting filled. Further, additionally, a user may specify a time, such as the middle of a trading session or any desired time, when the first order should be submitted.

In addition to using user-specified randomization values or a set of preconfigured randomization values available at the randomizer application 206, the randomizer application 206 could also dynamically adjust randomization values or apply randomization methods based on trading activities in the market. In one embodiment, depending on the state of the market, e.g., if the market is thin or heavy, a user may desire to decrease or increase randomized order quantities. In such an embodiment, if the market were thin, e.g., a small volume is traded, the randomizer application 206 could randomly place orders of smaller quantities until the market activity increased. Similarly, if the market activity were heavy, the randomizer application 206 could increase the order quantities.

In one embodiment, the randomizer application 206 or another application may monitor market activities and dynamically determine whether the market is thin or heavy. Based on that information, one or more randomized variables may be adjusted accordingly. For instance, the current market conditions and historical market conditions may be compared to determine if the market is thin or heavy. The historical market conditions may include historical market data associated with a previous trading day, or averaged historical market data taken over a few trading days, for instance. It should be understood that a user may obtain historical market data for a predetermined tradable object from third-party charts, for instance. In an alternative embodiment, an automated application, on a client terminal or another network entity accessible from the client terminal, could be used to monitor market activities over a predetermined period of time, such as over a number of days. However, it should be understood that this is only one example embodiment, and different embodiments are possible as well.

Using the historical market data, a trader may define one or more threshold levels to be used in determining if the current market activities are thin or heavy. Each threshold level may correspond to a number of incoming trade orders, a number of completed trades, a number of traders participating in the market, or order quantity. Further, for example, order quantities that may be used to determine if the market is heavy or thin may include quantities at the specified price level and at a few price levels away from the desired price. In such an embodiment, the current market conditions may be dynamically compared to one or more thresholds, and if the current market conditions exceed a heavy market threshold, for instance, the current market may be considered to correspond to the heavy market. Further, it should be understood that a trader may configure a number of threshold levels to be used throughout a trading day so that different threshold levels are used based on time of day. For instance, a trader may know that the market activity may be very heavy at the end of the trading day. Thus, the threshold levels to be used at the end of the trading day may be set by a trader accordingly so that, for instance, larger order quantities are submitted at the end of the trading day.

Further, it should be understood that the threshold levels may be automatically adjusted based on some events that may affect prices or market movement associated with one or more tradable objects being traded by a trader. For instance, a client terminal may include or link to an application tracking one or more events specified by a user. For instance, an event may be related to interest rates, unemployment rates, or other events. However, it should be understood that different events are possible as well.

Further, the randomizer application 206 could adjust the randomized order quantity based on the amount of time an order spends at one price level without getting filled. Such an embodiment may be especially useful for orders that are not submitted at the current market price, and thus, there is no guarantee that they will get filled. Such orders may include, for example, limit orders; however, the methods described herein are not limited to limit orders or variations thereof. In such an embodiment, if an order having a specific quantity is placed at the market, and the order does not get filled during a predetermined time period, the randomizer application 206 may remove the order from the market and choose from a variety of options what to do next. For example, the randomizer application 206 may (i) change the order quantity and place the order at the same price level, (ii) change the price level and keep the same quantity, or (iii) change both the price level and quantity.

It should be understood that the action that is taken by the randomizer application 206 upon detecting that the order does not get filled during the predetermined time period may be user configurable and may depend on the user's trading strategy. For instance, when the order does not get filled during a predetermined period of time, the order may be deleted and then may be placed at a different price level that is based on a market movement. Further, a user may set a number of rules, based on which another order is placed. For example, a user may wish to place another order immediately, or, alternatively, may wish to wait so that the market moves in a direction that is benefiting a user so that the user may get a better sell or buy price. However, it should be understood that different actions from the one described herein could also be taken by the randomizer application 206, and the present invention is not limited to the described actions. For instance, the randomizer application 206 could simply take the order off the market, e.g., delete the order.

Further, order quantities may be randomized based on the liquidity of the market. In a liquid market (the market with many bids and asks), a trader may want to submit much higher quantities than when the market is thin (the market with a few bids and asks). It should be understood that a trader may configure threshold values to be used for determining liquidity of the market and determining if the market is thin or liquid, based on which order quantities may be accordingly randomized.

Further, in another alternative embodiment, monitoring of market activities may involve monitoring a number of orders at a certain price level associated with an order. In such an embodiment, when a user designates an order quantity at a specific price level, the randomizer application 206 may first determine a number of orders at the specified price level, and then may randomly increase or decrease the original quantity based on the number of orders at that price level. For example, if the total number of orders were between 5-10 at a specific price level, then, the randomizer application 206 could place an order between 10-15, for example. If the total number of orders were between 10-20, the randomizer application 206 could place an order between 15-20. It should be understood that the randomizer application 206 may use a plurality of user configurable rules to determine the range of randomized orders based on the number of orders at a specific price level.

Further, alternatively, a randomization method may involve placing multi-directional orders. In such an embodiment, for instance, a trader may influence the market movement by placing many buy orders and causing the market to move up, and then placing many sell orders to cause the market to go down. Alternatively, a trader may simultaneously place a number of buy and sell orders to hide his position from other traders. It should be understood that a trader may set up a number of rules that, when used at the randomizer application 206, may automatically place orders to create a desired multi-directionality.

(iii) Large Quantity Order Randomization Methods

Some businesses, such as Brokers, Funds, Hedge Funds, and CTA's, may require the ability to place large quantity orders. To these businesses, it is imperative that their orders are anonymous and, further, that their intent to establish a large position is hidden from other traders. Typically, the large orders are executed by placing a plurality of smaller quantity orders over a period of time. Applying such a method, however, may result in other traders detecting patterns in the same order quantities being consecutively submitted in the market.

In one embodiment, to prevent other traders from detecting patterns associated with large quantity orders, time periods between submitting two consecutive orders may be randomized. For instance, the method of placing a large quantity order may have three configurable values, (i) a total desired position, (ii) a quantity for each order, and (iii) a time to reach the total desired position. According to one embodiment, when the three values are entered, the randomizer application 206 may determine a number of orders to be placed by dividing the total desired position by the specified quantity. Then, the randomizer application 206 may determine an average order send time by dividing the defined time to reach the total desired position by the number of orders. The randomizer application 206 may then use the average order send time as a variable to be randomized. To do that, for example, the randomizer application 206 may first determine a range of randomized send times. In one embodiment, the range of randomized send times may be between zero and twice the average order send time, for instance. In such an embodiment, the randomizer application 206 may then select a random number between zero and twice the average send time to determine when to place each order. Thus, the first random number will define when the first order is placed, the second random number may then be added to the first number, and an order may be placed at that time, and so on until each order is placed and the total desired position is reached.

For example, using the method described in the preceding paragraph, if a total desired position is 1,000, the quantity for each order is 100, and the time to reach the desired position is 5 hours, the randomizer application 206 may determine the number of orders to be 10, i.e., by dividing the total desired position by the quantity (1000/100=10). Next, the randomizer application 206 may determine the average send time to be 30 minutes, i.e., by dividing the time to reach the desired position by the number of orders (300 minutes/10=30 minutes). Then, to ensure that the orders are sent around every 30 minutes, the range of randomized send times may be set between 0 and 60 minutes, i.e., twice the average send time. The time for submitting the first order, the second order and the third order may then be selected, for example, to be 32, 14, and 47, etc. Thus, in such an embodiment, the first order is placed at 32 minutes, the second order is placed 14 minutes later at the time 32+14=46 minutes, and the third order will be placed 47 minutes later at 46+47=93 minutes, from the time when a timer was started. The method of randomizing the average send time may continue until the last order is placed and until the total desired position is reached. According to one embodiment, the last order is placed at a specified time rather than at a random time, and the quantity of the order may be different from the user-defined quantity, e.g., it could be an order of the remaining quantity that had not yet been filled. In the embodiment illustrated above, the last order could be placed 30 minutes before the 5 hours ending time, i.e., at 4 hours and 30 minutes from the initial time when the timer was started.

As explained in the preceding sections, such orders may be market orders or orders entered at specific user configurable price levels, e.g., limit orders, or a combination thereof, where some orders are market orders and some are limit orders. If the orders are limit orders, any quantity that does not get filled when a time for submitting the next order is reached may be deleted and then added to the next order.

Further, it should be understood that the times when the orders are placed in the market may be influenced by a market trend. For instance, the randomizer application 206 may monitor the market trend, and the times when the orders are placed may be adjusted accordingly. For instance, if the market moves significantly down at 4 hours and 15 minutes, the randomizer application 206 may place a buy order at some quantity at that time instead of placing the order at the preset time of 4 hours and 30 minutes. In one embodiment, a trader may preset a number of rules, such as market trend-related rules or other rules that may influence the times of placing the orders.

However, it should be understood that placing a large quantity order is not limited to defining the total desired position, the quantity for each order, and the time to reach the desired position. In an alternative embodiment, instead of specifying the quantity for each order, a number of orders to reach the total desired position could be defined and then used to determine the quantity, e.g., the order quantity in such an embodiment could be determined by dividing the total desired position by the number of orders to reach the desired position.

Further, it should be understood that the method of selecting when the orders are placed is not limited to the embodiment described above. In an alternative embodiment, instead of selecting a random number between zero and twice the average send time, the randomizer application 206 may select a random number between zero and the average order time as the time to place the first order, then a random number between the average send time and twice the average send time as the time to place the second order, then a random number between twice the average send time and three time the average send time as the time to place the third order, and so on. Using the example presented above, the first randomized send time may be selected between 0 and 30 minutes from the initial time configurable by a user, the second randomized send time would be selected between 30 and 60 minutes, and the third time would be selected between 60 and 90 minutes, etc. In such an embodiment, the first order may be placed at 23 minutes, the second order may be placed at 49 minutes, and the third order may be placed at 61 minutes from the time specified by the user, etc. Similarly to the method described above, the last order placed could be of the total quantity that had not been filled.

Further, it should be understood that the method of randomizing time when the large quantity orders are placed may be combined with the method of randomizing order quantities so that randomized order quantities are placed at randomized times until the desired position is reached within the specified time to reach the desired position.

Additionally, the randomized quantity may be adjusted based on the current state of the market. In one embodiment, the market may be characterized based on its volatility and density. Specifically, a large amount of volume may suggest a dense market, and a small amount of volume may suggest a non-dense market. The market may be considered volatile when orders are placed and changed quickly, e.g., when many orders are deleted, edited, or added, for instance. Thus, the market may be considered non-volatile when orders are placed in the market, but the orders are not changing quickly. Further, the market may be thick and fast, meaning that a large volume orders are placed and filled quickly, or thin and fast, meaning that a small volume orders are placed and filled quickly. If the market is thick, the randomized quantity may be increased, and, if the market is thin, the randomized quantity may be decreased. Similarly, if the market is fast, the randomized time intervals may be shorter, so that more orders are placed within a specific time interval when the market is fast. Then, if the market is slow, the randomized time intervals may be longer. Thus, to hide large quantity orders, the current state of the market may be determined first, and then either time periods between sending two consecutive orders or order quantities may be randomized depending on the state of the market, for instance. It should be understood that different embodiments are also possible. As mentioned earlier, the methods of randomizing times when the orders are placed and the methods of randomizing quantities may be used in combination with one another.

In an alternative embodiment, rounds of multiple orders may be submitted at the same time to prevent other users from detecting large order quantities. In such an embodiment, a large quantity order, or any other order, may be defined using five user-configurable values, (i) a total desired position, (ii) a number of rounds of multiple orders to be placed, (iii) a total time, (iv) quantities for each order in a round, and (v) order placement levels (such as price levels) for each round orders, e.g., a plurality of orders to be placed at the specified priced levels. As explained in reference to the preceding paragraphs, the total desired position defines the total quantity desired by a user. Then, the number of rounds of orders defines a number of sets of orders including a plurality of orders to be placed to reach the total desired position in the specified time. For example, a user may define the number of rounds of orders to be 10, but within each of those rounds, 5 orders could be placed at different price levels. The next order parameter, the total time, defines a time interval within which the total desired position should be reached. Then, the quantity of each order is associated with order quantities that are placed in each round. For example, when multiple orders are placed in each round of orders, each of these orders can have different quantities.

A user may specify a plurality of percentage values to be applied to the specified quantity to determine quantities for each of the plurality of orders to be submitted in each round of orders. It should be understood that each round of orders may be associated with different quantity orders. For instance, order quantities associated with orders to be placed in the first round of orders may be randomized to determine quantities of orders in the second round. Lastly, the order placement levels define where the orders are placed, e.g., price levels, for instance. In such an embodiment, one order could be placed at the desired price level, and then, depending if the order is to buy or sell, a number of orders are placed at −/+1, −/+2, −/+3, etc., ticks from the market price or from the user-defined price. In such an embodiment, one of the orders is the market order, while remaining orders are limit orders. Thus, placing a round of multiple orders at different price levels not only serves as means for hiding large quantity orders but may also maximize the profit. It should be understood that multiple orders, in the same round of orders, may be placed at different price levels in the direction of the market trend so that, for example, if the market trend is up, sell orders may be placed at the inside market and then at +1, +2, +3 ticks from the inside market, or from any price configurable by a user. Further, the order quantities may be automatically adjusted based on the market trend. For instance, if the market trend is beneficial to a trader, order quantities in the round of the orders during that time may be increased based on any user configurable rules. Further, quantities in each round may be adjusted based on a number of fills during a previous round as has been described in earlier sections, for instance.

For example, if the total quantity for one round of sell orders is 100, the number of rounds of orders is 10, the number of orders in each rounds is 4, the quantities for each order are 50% of 100 for the first order, 25% of 100 for the second order, 15% for the third order, and 10% of 100 for the fourth order in each round, then, in the first round of orders, the first order of 50 may be placed at the specified price, the second order of 25 may be placed at the specified price +1 tick, the third order of 15 may be placed at the specified price +2 ticks, and the fourth order of 10 may be placed at the specified price +3 ticks. The second round of orders may be submitted according to the predefined rules; however, as explained earlier, quantities at each price level may be adjusted based on unfilled quantities from the first round of orders, and further quantities in the second round of orders may be randomized based on any randomization method desirable by a user.

In the embodiment illustrated above, it should be understood that orders placed away from the inside market have a lower possibility of getting filled unless the market moves in that direction. Due to this fact, the quantity desired for each round of orders may be increased by 25%, or any other user configurable percentage or a constant value, to ensure that each round of orders matches as much quantity as possible, and that the last round of orders is not a large quantity order. Thus, in such an embodiment, the last order that is placed according to this method may consist of a market order of the total quantity that hasn't been filled in the previous rounds of orders. Alternatively, a special set of rules may exist for placing the last round of orders. For instance, if the order quantity of the last order exceeds a predetermine quantity configured by a user, the remaining quantity may be further randomized according to the rules configured by a user.

Further, it should be understood that in an alternative embodiment, instead of specifying each price level for a plurality of orders in each round, a user could instead specify a single price level and at least one randomization parameter that could be used to determine a plurality of price levels for each order in the round.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, it should be understood that the randomization methods described above may be used separately, or in any combination specified by the user.

Further, it will be apparent to those of ordinary skill in the art that methods involved in the system and methods for randomizing orders in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A method for automatically placing randomized orders in an electronic trading environment, the method comprising:
   receiving an order request at a client terminal to place an order to buy or sell an order quantity of a tradeable object being traded in a market at an electronic exchange at a price level;
   receiving historical market data at the client terminal, the market data identifying historical market conditions for the tradeable object, including a number of completed trades for the tradeable object during a predetermined prior period of time;
   receiving current market data at the client terminal, the current market data identifying current market conditions including at least one working quantity associated with an order for the tradeable object at the electronic exchange;
   comparing the historical market conditions and the current market conditions for the tradeable object via a randomizer application of the client terminal to determine whether a current market activity is thin or heavy;
   dynamically generating a randomized order quantity based on the order quantity and an established randomization value via a randomizer application of the client terminal;
   adjusting the randomized order quantity via the client terminal such that when the current market activity exceeds a predefined heavy market threshold, the randomized order quantity is increased, and when the current market activity is below a predefined thin market threshold, the randomized order quantity is decreased, the heavy market threshold and the thin market threshold be defined according to the historical market data; and submitting the order having the adjusted randomized order quantity to the electronic exchange via the client terminal.

2. The method of claim 1, wherein the established randomization value comprises at least one constant value.

3. The method of claim 2, wherein the established randomized value comprises an upper range constant value and a lower range constant value applied to the order quantity to generate an order quantity range, and the randomized order quantity is selected from the order quantity range.

4. The method of claim 1, wherein the established randomization value comprises at least one percentage value.

5. The method of claim 4, wherein the established randomization value comprises an upper percentage value and a lower percentage value applied to the order quantity to generate an order quantity range, and the randomized order quantity is selected from the order quantity range.

6. The method of claim 1, wherein the current market activity is based on a working order quantity at a predetermined price in the market for the tradeable object, wherein the predefined heavy market threshold comprises an order quantity value, the predefined thin market threshold comprises an order quantity value, and the predetermined price comprises the price level of the order.

7. The method of claim 1, wherein the current market activity is further based on a number of orders being submitted to the market for the tradeable object, and the predefined heavy market threshold comprises an upper number of orders, and the predefined thin market threshold comprises a lower number of orders.

8. The method of claim 7, wherein the number of orders being submitted to the market for the tradeable object are at the price level of the order.

9. The method of claim 1, wherein the current market activity is based on a working order quantity at a predetermined price in the market for the tradeable object.

10. The method of claim 1, wherein the current market activity is based on a working order quantity in the market for the tradeable object at a plurality of price levels.

11. The method of claim 1, further comprising:
receiving a plurality of predefined threshold levels, each of the plurality of predefined threshold levels associated with a specified time; and
dynamically changing at least one of the predefined heavy market threshold and the predefined thin market threshold to at least one of the plurality of predefined threshold levels based on the specified time associated with the at least one of the plurality of predefined threshold levels.

12. The method of claim 1, further comprising:
receiving a plurality of predefined threshold levels, each of the plurality of predefined threshold levels associated with an event; and
dynamically changing at least one of the predefined heavy market threshold and the predefined thin market threshold to at least one of the plurality of predefined threshold levels based on detecting the event associated with the at least one of the plurality of predefined threshold levels.

13. The method of claim 12, wherein the event associated with the at least one of the plurality of predefined threshold levels is based on interest rates or unemployment rates.

14. The method of claim 1, wherein the established randomization value is user specified.

15. A readable memory device having stored therein instructions which when executed by a client terminal cause the client terminal to perform a method for automatically placing randomized orders in an electronic trading environment, the method comprising:
receiving an order request at a client terminal to place an order to buy or sell an order quantity of a tradeable object, being traded in a market at an electronic exchange at a price level;
receiving historical market data at the client terminal, the market data identifying historical market conditions for the tradeable object, including a number of completed trades for the tradeable object during a predetermined prior period of time;
receiving current market data at the client terminal, the current market data identifying current market conditions including at least one working quantity associated with an order for the tradeable object at the electronic exchange;
comparing the historical market conditions and the current market conditions for the tradeable object via a randomizer application of the client terminal to determine whether a current market activity is thin or heavy;
dynamically generating a randomized order quantity based on the order quantity, and an established randomization value via a randomizer application of the client terminal;
adjusting the randomized order quantity via the client terminal such that when the current market activity exceeds a predefined heavy market threshold, the randomized order quantity is increased, and when the current market activity is below a predefined thin market threshold, the randomized order quantity is decreased, the heavy market threshold and the thin market threshold be defined according to the historical market data; and
submitting the order having the adjusted randomized order quantity to the electronic exchange via the client terminal.

* * * * *